(12) United States Patent
Mintz et al.

(10) Patent No.: US 8,249,980 B2
(45) Date of Patent: Aug. 21, 2012

(54) IMPLIED ORDER QUALITY

(75) Inventors: Sagy Pundak Mintz, Lincolnshire, IL (US); Michael J. Burns, Riverside, IL (US); Alexander D. Deitz, Jersey City, NJ (US)

(73) Assignee: Trading Technologies International, Inc., Chicago, IL (US)

( * ) Notice: Subject to any disclaimer, the term of this patent is extended or adjusted under 35 U.S.C. 154(b) by 132 days.

(21) Appl. No.: 12/822,979

(22) Filed: Jun. 24, 2010

(65) Prior Publication Data

US 2011/0320334 A1  Dec. 29, 2011

(51) Int. Cl.
*G06Q 40/00* (2012.01)
(52) U.S. Cl. .......................... 705/37; 705/35
(58) Field of Classification Search ............... 705/35–45
See application file for complete search history.

(56) References Cited

U.S. PATENT DOCUMENTS

| | | | |
|---|---|---|---|
| 5,812,988 A | 9/1998 | Sandretto | |
| 6,003,018 A | 12/1999 | Michaud et al. | |
| 6,078,904 A | 6/2000 | Rebane | |
| 6,548,882 B1 * | 4/2003 | Zwicknagl et al. | 257/522 |
| 6,772,132 B1 | 8/2004 | Kemp, II et al. | |
| 6,938,011 B1 | 8/2005 | Kemp, II et al. | |
| 7,039,610 B2 | 5/2006 | Morano et al. | |
| 7,127,424 B2 | 10/2006 | Kemp, II et al. | |
| 7,162,447 B1 | 1/2007 | Cushing | |
| 7,228,289 B2 | 6/2007 | Brumfield et al. | |
| 7,389,268 B1 | 6/2008 | Kemp, II et al. | |
| 7,437,325 B2 | 10/2008 | Kemp, II et al. | |
| 7,548,882 B1 * | 6/2009 | Pazner | 705/37 |
| 7,571,134 B1 | 8/2009 | Burns et al. | |
| 7,765,134 B1 | 7/2010 | Pazner | |
| 7,865,418 B2 | 1/2011 | Uenohara et al. | |
| 7,870,063 B1 | 1/2011 | Pazner | |
| 8,019,673 B1 | 9/2011 | Rooney | |
| 2003/0200167 A1 | 10/2003 | Kemp, II et al. | |
| 2005/0192886 A1 | 9/2005 | Wender | |
| 2007/0118457 A1 | 5/2007 | Peterffy et al. | |
| 2007/0198387 A1 | 8/2007 | Uenohara et al. | |
| 2010/0010937 A1 | 1/2010 | Rosenthal | |
| 2010/0017321 A1 | 1/2010 | Callaway et al. | |
| 2011/0055069 A1 | 3/2011 | Pazner | |

OTHER PUBLICATIONS

Code of Federal Regulations, Commodity and Securities Exchanges, Title 17, Section 242.*
U.S. Appl. No. 13/198,674, filed Aug. 24, 2011, Rooney.
Regression Analysis Webpage [online], Wikipedia, Jan. 4, 2007. Retrieved from the Internet: http://en.wikipedia.org/wiki/Ordinary_least_squares_regression.
International Search Report and Written Opinion of International Application No. PCT/US2011/038842, dated Aug. 25, 2011 (mailed Sep. 15, 2011).

* cited by examiner

*Primary Examiner* — Richard C Weisberger
(74) *Attorney, Agent, or Firm* — McDonnell Boehnen Hulbert & Berghoff LLP

(57) ABSTRACT

Certain embodiments of the present inventions provide implied order quality. The quality may be viewed as an indication of how much an implied order and/or an aggregate quality for implied orders may be relied upon. Certain embodiments utilize various techniques for determining a quality for an implied order. Certain embodiments utilize various techniques for determining an aggregate quality for implied orders. Certain embodiments provide an indicator of the quality for an implied order and/or of the aggregate quality for implied orders. Certain embodiments filter an implied order based on a determined quality value and/or determined aggregate quality.

12 Claims, 7 Drawing Sheets

| TO-A | | | | | | | | | |
|---|---|---|---|---|---|---|---|---|---|
| | | | | | | | | | 99850 | 2 | 2 | 4 | 3 |
| | | | | | | | | | 99825 | 2 | 5 (0.75) | |
| | | | | | | | | | 99800 | 1 | | |
| | | | | | | | | | 99775 | 1 | 3 | |
| | 2 (0.4) | 2 (0.8) | | | | | | | 99750 | 2 (0.25) | | |
| | 1 | 1 | | | | | | | 99725 | | | |
| | 1 | 1 | | | | | | | 99700 | | | |
| 2 | 3 (0.8) | 2 | | | | | | | 99675 | | | |
| | 4 | 5 | | | | | | | 99650 | | | |
| | | | | | | | | | 99625 | | | |

Figure 3B:
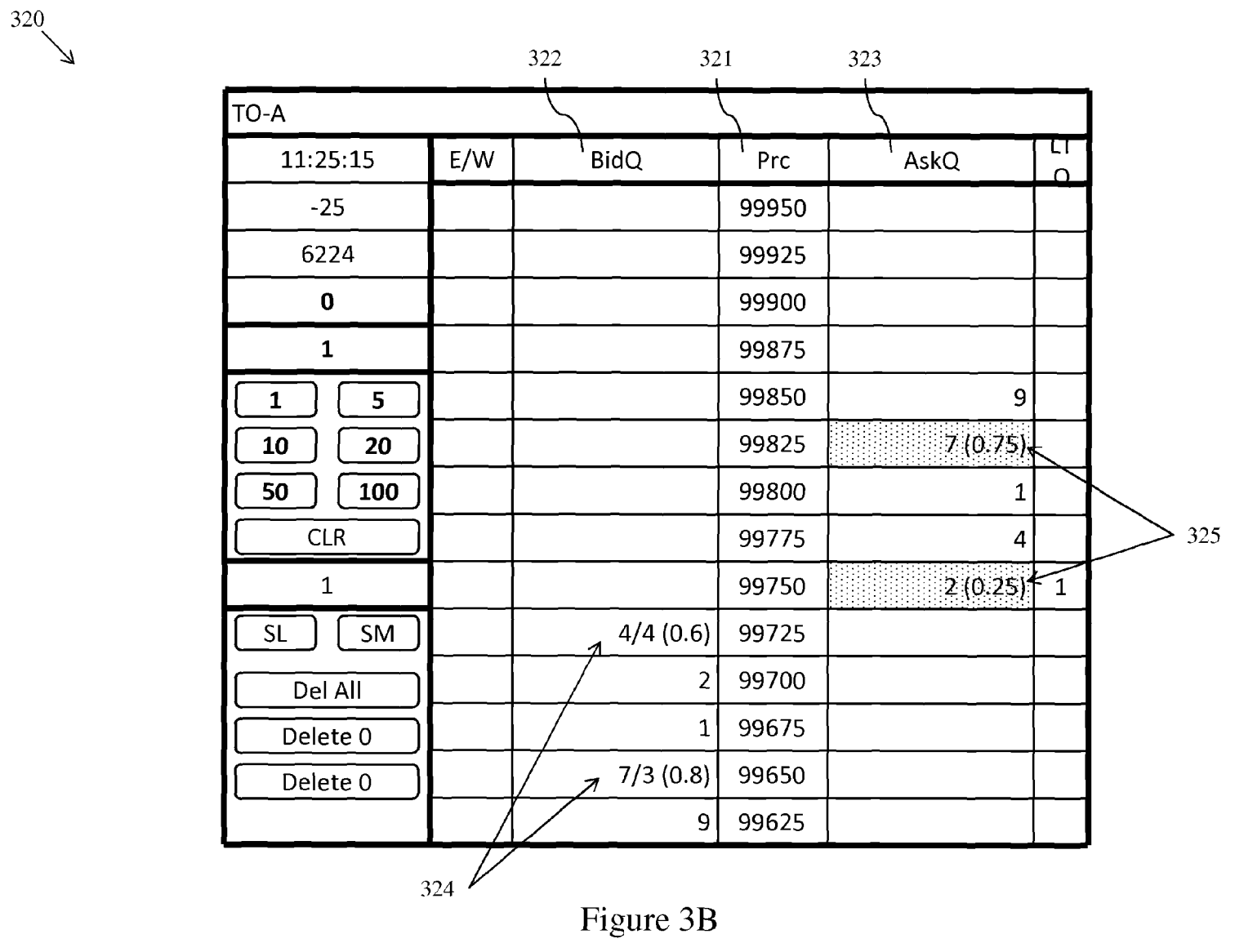

| TO-A | E/W | BidQ | Prc | AskQ | LT |
|---|---|---|---|---|---|
| 11:25:15 | | | 99950 | | 0 |
| -25 | | | 99925 | | |
| 6224 | | | 99900 | | |
| 0 | | | 99875 | | |
| 1 | | | 99850 | 9 | |
| 1  5 | | | 99825 | 7 (0.75) | |
| 10  20 | | | 99800 | 1 | |
| 50  100 | | | 99775 | 4 | |
| CLR | | 4/4 (0.6) | 99750 | 2 (0.25) | 1 |
| 1 | | 2 | 99725 | | |
| SL  SM | | 1 | 99700 | | |
| Del All | | 7/3 (0.8) | 99675 | | |
| Delete 0 | | 9 | 99650 | | |
| Delete 0 | | | 99625 | | |

| Contract | Depth | BQual | BidQ | BidPrc | AskPrc | AskQ | AQual |
|---|---|---|---|---|---|---|---|
| TO-A | ⊙ | AVG | 4 | 99725 | 99750 | 2 | |
| | | | 2 | 99700 | 99775 | 4 | ▨ |
| | | HIGH | 1 | 99675 | 99800 | 1 | |
| | ←→ | | 7 | 99650 | 99825 | 7 | ▨ |
| | | | 9 | 99625 | 99850 | 9 | |

Figure 3C

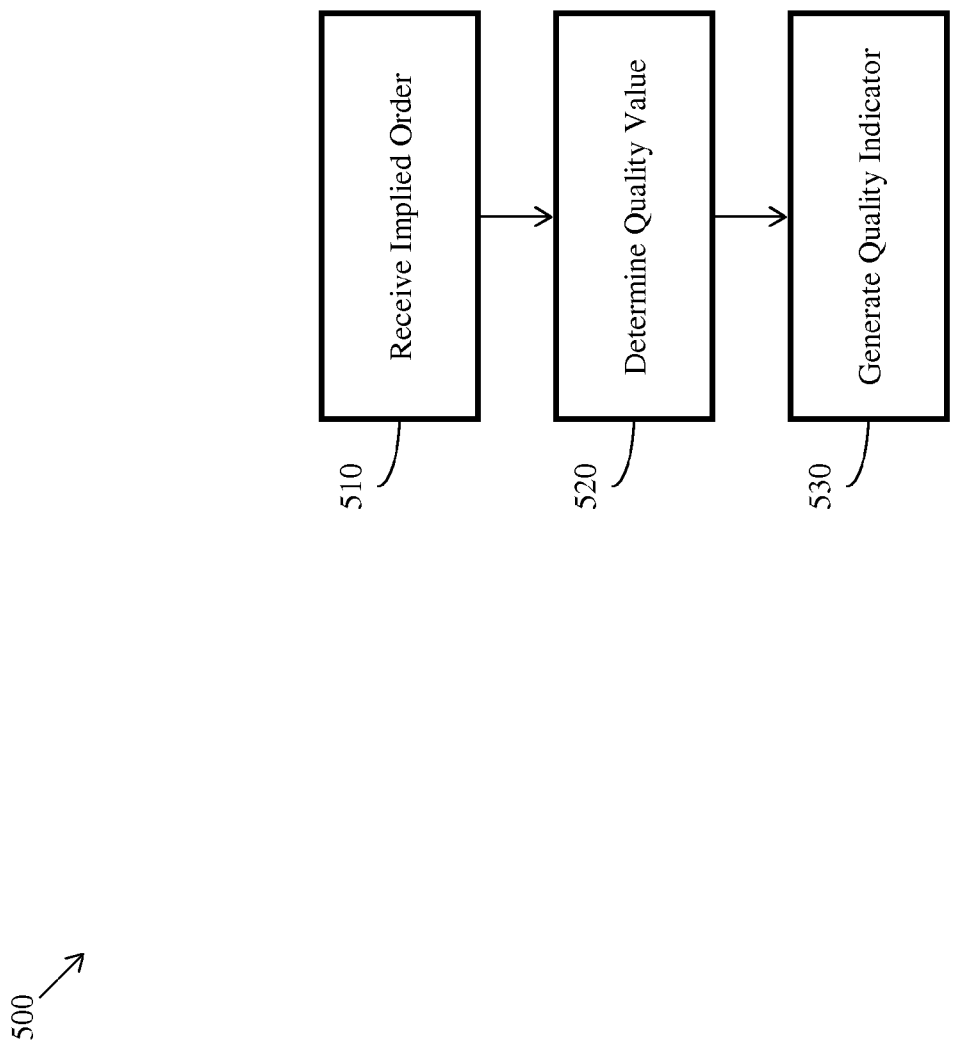

IMPLIED ORDER QUALITY

BACKGROUND

The present inventions are directed towards electronic trading systems. More particularly, certain embodiments of the present inventions are directed towards implied order quality in electronic trading systems.

An electronic trading system provides for electronically matching orders to buy and sell items to be traded. The items may include, for example, stocks, options, futures contracts, and commodities. Typically, an electronic exchange in the electronic trading system is used to match the orders. In addition, the electronic exchange provides market data to various client devices in the electronic trading system used by traders to place the orders. For example, the electronic exchange may provide market data such as prices for various items available for trading and trade confirmations indicating what trades have occurred at what quantities and/or prices.

A trader typically desires to know about as many buy and/or sell orders as possible for a particular market. For example, when trading in a particular market, a trader may find it useful to see direct orders in the market. In addition, a trader may find it useful to see prices and quantity that have been implied into the market, sometimes referred to as "implieds," "implied quantity," "implied quantities," or "implied orders." Implied orders are derived from direct orders in other markets. For example, orders in outright markets may imply orders into a spread market and orders in a spread market plus orders in an outright market may imply orders into another outright market. Providing implied orders along with direct orders in a particular market may improve price discovery and liquidity, for example.

However, implied orders may go away quickly and/or unexpectedly, so a trader is exposed to risk by relying on them. Current systems allow a trader to select whether implieds for a particular market should be shown and/or utilized for trading. A trader may be able to see either all implieds or no implieds, for example. Also, some current systems may be configured to show implieds for a particular market when the implied is available from a specified minimum number of sources. In this case, because the implied is available from multiple sources, this may increase the chance that at least a portion of the implied order will be available when the trader wishes to trade against it. However, this is still problematic as a trader may miss opportunities and/or not get the best price by ignoring some or all implieds and the trader is still exposed to risk by utilizing the implieds.

SUMMARY

The inventions described herein include, but are not limited to, various devices, systems, methods, and computer program products. Only a few, of the many, inventions are summarized in this section.

Certain embodiments of the present inventions provide implied order quality. The quality may be viewed as an indication of how much an implied order and/or an aggregate quality for implied orders may be relied upon. Certain embodiments utilize various techniques for determining a quality for an implied order. Certain embodiments utilize various techniques for determining an aggregate quality for implied orders. Certain embodiments provide an indicator of the quality for an implied order and/or of the aggregate quality for implied orders. Certain embodiments filter an implied order based on a determined quality value and/or determined aggregate quality.

Certain embodiments of the present invention provide a method including receiving by a computing device an implied order for a tradable object, determining by the computing device a quality value for the implied order for the tradable object, and generating by the computing device a quality indicator representing the quality value for the implied order.

Certain embodiments of the present invention provide a method including receiving by a computing device a plurality of implied orders for a tradable object, determining by the computing device an aggregate quality value for the plurality of implied orders for the tradable object, and generating by the computing device an aggregate quality indicator representing the aggregate quantity value for the plurality of implied orders.

Other embodiments of the present inventions are described below. In addition, modifications may be made to the described embodiments without departing from the spirit or scope of the inventions.

BRIEF DESCRIPTION OF THE DRAWINGS

Example embodiments are described herein with reference to the following drawings.

FIG. 3A illustrates a trading interface in which certain embodiments of the present inventions may be employed.

FIG. 3B illustrates a trading interface in which certain embodiments of the present inventions may be employed.

FIG. 3C illustrates a trading interface in which certain embodiments of the present inventions may be employed.

FIG. 5 illustrates a flowchart of a method according to an embodiment of the present inventions.

Figure 1:
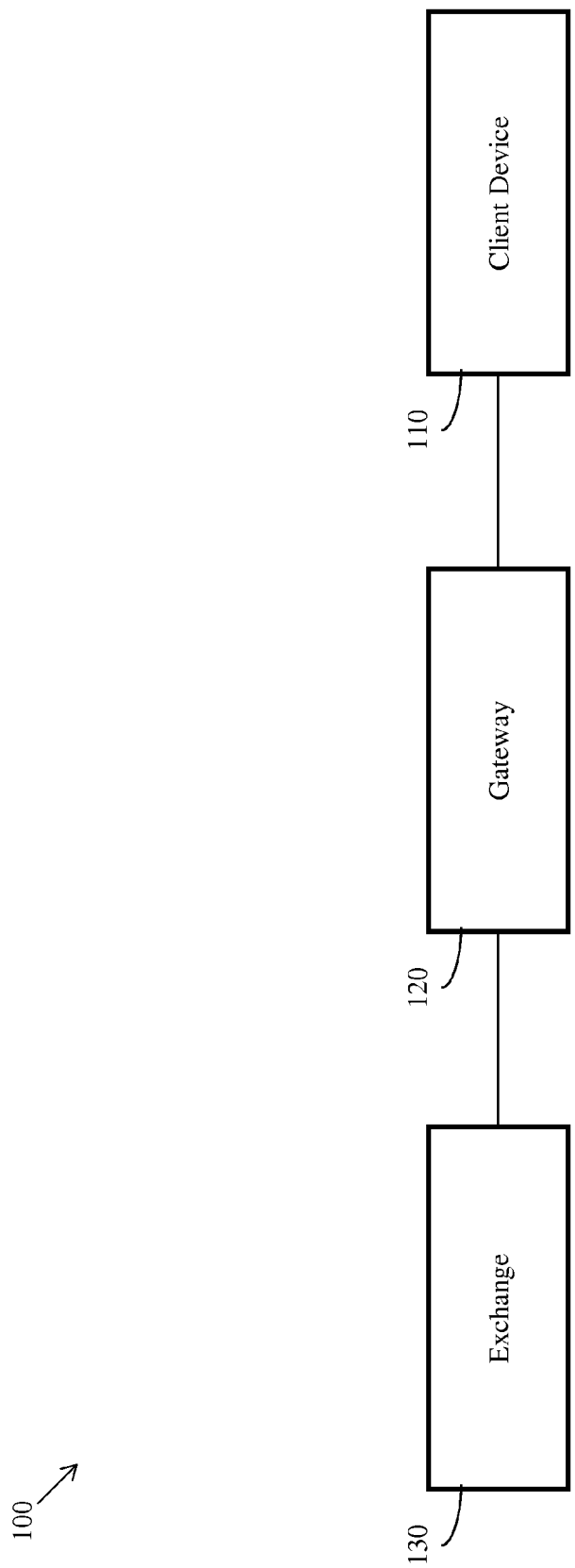
FIG. 1 illustrates a block diagram of an electronic trading system in which certain embodiments of the present inventions may be employed.

The foregoing summary, as well as the following detailed description, will be better understood when read in conjunction with the drawings which show certain embodiments of the present inventions. The drawings are for the purpose of illustrating certain embodiments, but it should be understood that the present inventions are not limited to the arrangements and instrumentality shown in the drawings.

DETAILED DESCRIPTION

Certain embodiments of the present inventions provide implied order quality. The quality may be viewed as an indication of how much an implied order and/or an aggregate quality for implied orders may be relied upon. Certain embodiments utilize various techniques for determining a quality for an implied order. The quality may be determined based on the generation of the implied order, the origin of the implied order, the number and/or quantity of the orders the implied order is derived from, the price level of the implied order, and/or the combination of one or more techniques, for example. Certain embodiments utilize various techniques for determining an aggregate quality for implied orders. The aggregate quality may be determined based on the number and/or quantity of the implied orders, the price level of the implied orders, and/or the combination of one or more techniques, for example. Certain embodiments provide an indicator of the quality for an implied order and/or of the aggregate quality for implied orders. Certain embodiments filter an implied order based on a determined quality value and/or determined aggregate quality.

I. Example Electronic Trading System

FIG. 1 illustrates a block diagram of an electronic trading system 100 in which certain embodiments of the present inventions may be employed. The system 100 includes a client device 110, a gateway 120, and an electronic exchange 130. The client device 110 is in communication with the gateway 120. The gateway 120 is in communication with the exchange 130.

In operation, the client device 110 may be utilized by a user to send orders to buy or sell tradable objects at the exchange 130. The orders are sent through the gateway 120 to the exchange 130. In addition, market data is sent from the exchange 130 through the gateway 120 to the client device 110. The user may also utilize the client device 110 to monitor this market data and base a decision to send an order for a tradable object on the market data.

A tradable object is anything which can be traded with a quantity and/or a price. For example, financial products such as stocks, options, bonds, futures, currency, warrants, funds derivatives, commodities, traded events, goods, and collections and/or combinations of these may be tradable objects. A tradable object may be "real" or "synthetic." A real tradable object includes products that are listed by an exchange. A synthetic tradable object includes products that are defined by the user and are not listed by an exchange. For example, a synthetic tradable object may include a combination of real (or other synthetic) products such as a synthetic spread created by a trader utilizing a client device 110.

The client device 110 may include one or more electronic computing platforms such as a hand-held device, laptop, desktop computer, workstation with a single or multi-core processor, server with multiple processors, and/or cluster of computers, for example.

The client device 110 may include one or more trading applications. The trading application(s) may, for example, process market data by arranging and displaying the market data in trading and charting windows. This processing may be based on user preferences, for example. The trading application(s) may include an automated trading tool such as an automated spread trading tool, for example.

The client device 110 may include an electronic trading workstation, a portable trading device, an algorithmic trading or "black-box" system, an embedded trading system, and/or an automated trading tool, for example. For example, the client device 110 may be a computing system running a copy of X_TRADER™, an electronic trading platform provided by Trading Technologies International, Inc. of Chicago, Ill. As another example, the client device 110 may be a computing device running the automated trading tool may Autospreader™, also provided by Trading Technologies International, Inc.

The client device 110 is adapted to send orders to buy or sell tradable objects. The client device 110 may also be adapted to cancel orders, change orders, and/or query an exchange, for example.

The orders sent by the client device 110 may be sent at the request from a user or automatically, for example. For example, a trader may utilize an electronic trading workstation to place an order for a particular tradable object, manually providing various parameters for the order such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the client device 110 includes a user interface. The user interface may include one or more display devices for presenting a text-based or graphical interface of a trading application to a user, for example. For example, the display devices may include computer monitors, hand-held device displays, projectors, and/or televisions. The user interface may be used by the user to specify or review parameters for an order using a trading application. The user interface may include one or more input devices for receiving input from a user, for example. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, the orders from the client device 110 are sent to the exchange 130 through the gateway 120. The client device 110 may communicate with the gateway 120 using a local area network, a wide area network, a virtual private network, a T1 line, a T3 line, an ISDN line, a point-of-presence, and/or the Internet, for example.

The gateway 120 is adapted to communicate with the client device 110 and the exchange 130. The gateway 120 facilitates communication between the client device 110 and the exchange 130. For example, the gateway 120 may receive orders from the client device 110 and transmit the orders to the exchange 130. As another example, the gateway 120 may receive market data from the exchange 130 and transmit the market data to the client device 110.

In certain embodiments, the gateway 120 performs processing on data communicated between the client device 110 and the exchange 130. For example, the gateway 120 may process an order received from the client device 110 into a data format acceptable by the exchange 130. Similarly, the gateway 120 may transform market data in an exchange-specific format received from the exchange 130 into a format understood by the client device 110. The processing of the gateway 120 may also include tracking orders from the client device 110 and updating the status of the order based on fill confirmations received from the exchange 130, for example. As another example, the gateway 120 may coalesce market data from the exchange 130 and provide it to the client device 120.

In certain embodiments, the gateway 120 provides services other than processing data communicated between the client device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, and/or the Internet, for example.

The exchange 130 is adapted to match orders to buy and sell tradable objects. The tradable objects may be listed for trading by the exchange 130. The orders may include orders received from the client device 110, for example. Orders may be received from the client device 110 through the gateway 120, for example. In addition, the orders may be received from other devices in communication with the exchange 130. That is, typically the exchange 130 will be in communication with a variety of other client devices (which may be similar to client device 110) that also provide orders to be matched.

The exchange 130 is adapted to provide market data. The market data may be provided to the client device 110, for example. The market data may be provided to the client device 110 through the gateway 120, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, the system 100 includes more than one client device 110. For example, multiple client devices similar to the client device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the client device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the client device 110 to trade at more than one exchange through the gateway 120, for example.

In certain embodiments, the client device 110 includes one or more computing devices or processing components. In other words, the functionality of the client device 110 may be performed by more than one computing device. For example, one computing device may generate orders to be sent to the exchange 130 while another computing device may provide a graphical user interface to a trader. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the client device 110. For example, the components of the gateway 120 may be part of the same computing platform as the client device 110. As another example, the functionality of the gateway 120 may be performed by components of the client device 110. In certain embodiments, the gateway 120 is not present. Such an arrangement may occur when the client device 110 does not need to utilize the gateway 120 to communicate with the exchange 130, for example. For example, if the client device 110 has been adapted to communicate directly with the exchange 130.

In certain embodiments, the gateway 120 is physically located at the same site as the client device 110. In certain embodiments, the gateway 120 is physically located at the same site as the exchange 130. In certain embodiments, the client device 110 is physically located at the same site as the exchange 130. In certain embodiments, the gateway 120 is physically located at a site separate from both the client device 110 and the exchange 130.

While not shown for the sake of clarity, in certain embodiments, the system 100 may include other devices that are specific to the communications architecture such as middleware, firewalls, hubs, switches, routers, exchange-specific communication equipment, modems, security managers, and/or encryption/decryption devices.

Figure 2:
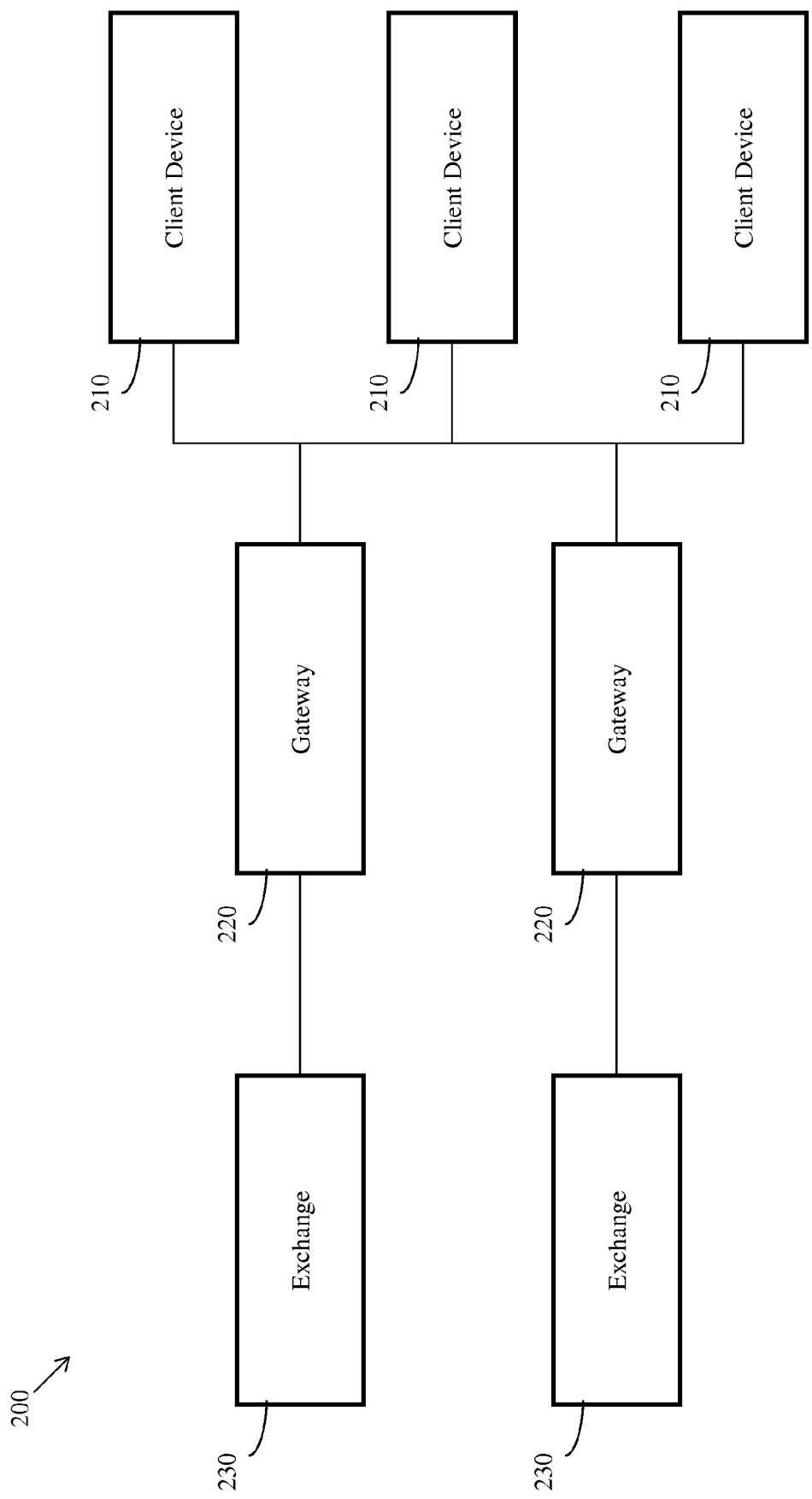
FIG. 2 illustrates a block diagram of an electronic trading system in which certain embodiments of the present inventions may be employed.

FIG. 2 illustrates a block diagram of an electronic trading system 200 in which certain embodiments of the present inventions may be employed. The system 200 includes one or more client devices 210, one or more gateways 220, and one or more electronic exchanges 230. The client devices 210 are in communication with one or more of the gateways 220. Each gateway 220 is in communication with a corresponding exchange 230.

One or more of the client devices 210 may be similar to the client device 110, discussed above, for example. One or more of the gateways 220 may be similar to the gateway 120, discussed above, for example. One or more of the exchanges 230 may be similar to the exchange 130, discussed above, for example.

In operation, a client device 210 may be utilized by a user to send orders to buy or sell tradable objects listed at different exchanges 230. The orders are sent through one or more of the gateways 220 to one or more of the exchanges 230. In addition, market data is sent from the exchanges 230 through the gateways 220 to one or more of the client devices 210. The user may also utilize a client device 210 to monitor this market data and base a decision to send an order for a tradable object on the market data.

In certain embodiments, a client device 210 is in communication with one of the gateways 220. In certain embodiments, a client device 210 is in communication with more than one of the exchanges 230.

In certain embodiments, a gateway 220 is in communication with one of the exchanges 230. In certain embodiments, a gateway 220 is in communication with more than one of the exchanges 230.

In certain embodiments, a client device 210 is adapted to communicate directly with one or more of the exchanges 230 and does not utilize a gateway 220.

The components, elements, and/or functionality of the systems 100 and/or 200 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a processor of a general purpose computer or other processing device.

II. Implied Pricing

As noted above, a trader typically desires to know about as many buy and/or sell orders as possible for a particular market. Providing implied orders along with direct orders in a particular market may improve price discovery and liquidity, for example.

Implied prices and their implied quantities may be useful at trading terminals. By having such information that better characterizes the market made available and/or displayed at the trading terminals, a trader (or trading-related software application) may be able to make better decisions about a particular trading strategy. This can lead to better prices and greater liquidity for the trader.

Implied prices and their implied quantities may also be useful at an exchange. By having available information that better characterizes the market at the exchange, the matching engine may be able to match orders at improved prices or can add liquidity to certain tradable objects or strategies.

There are three major types of implied pricing: implied in, implied out, and implieds from implieds. An implied in, such as implied spread data, is determined by combining outright legs to imply the spread between the legs. For example, with two outright legs "A" and "B," an implied bid price for a spread AB may be calculated as follows: (Bid Price Leg A)−(Ask Price Leg B). Then, an implied ask price for the spread AB may be calculated as follows: (Ask Price Leg A)−(Bid Price Leg B). An implied out occurs when direct prices of one leg and the spread between the legs are used to imply a price in a second leg of the spread. For example, an implied ask price for leg "A" may be calculated as follows: (Ask price Spread AB)+(Ask price of leg B). Implieds from implieds occur when an implied price/quantity is used to imply another price/quantity. It should be understood that implieds may involve more than two tradable objects. Implieds may be determined with multi-leg spreads, strips, butterflies, or straddles, for example.

There are different generations of implied pricing. Generations indicate how far removed an implied price/quantity is from a direct price. For example, a first generation implied price is generated from two direct prices, and a second generation implied price is generated using a first generation implied price. Additional generations of implied pricing may also be determined.

Implied orders may be determined by an exchange and/or by a client device or other system. For example, implieds may be calculated by an exchange, at a central location in a trading environment (for example, a server or gateway shared by multiple client devices), or on a client machine (for example, as part of a trading application or as a separate application, such as an implied engine). An exchange may only provide the implied quantity at an implied price and not the individual implied orders which make up such an implied quantity. In this case, the entire implied quantity at the implied price may be treated as a single implied order.

Some exchanges may determine implieds but not provide the information to traders, even though the implieds are considered when checking for matches. This may be done because the implied information may require additional network bandwidth. In such a situation, a trader may end up matching against this "invisible" quantity.

Even if an exchange does not determine implieds, the implieds may be calculated based on available market data by a trading application, gateway, or implied engine, for example. Because the exchange does not determine the implieds, it cannot directly match against these calculated ones. However, a trader may still wish to know about the implied orders for other reasons. For example, a trader may use the legs that make up an implied to get a desired price. The trader may, for example, see a calculated implied bid for 10 at a price of 100 when the market has an offer for 10 at a price of 99. The trader could then buy 10 at 99 in the market and send the needed orders to sell 10 at a price of 100.

In current systems, once the implieds are determined, they are all treated the same. That is, current systems may calculate a set of implieds and may filter those implieds based on some specified maximum number of generations. The determined implieds are then provided to a trader or trading system with no further distinction between them (beyond simply indicating that the implieds are implied and not direct).

However, not all implied orders are of equal "quality." Quality may be viewed as an indication of how much an implied order and/or an aggregate quality for implied orders may be relied upon. Quality information can be very useful to traders because, as discussed above, a trader is exposed to risk by relying on implied orders. For example, implieds from multiple sources may be more reliable/less risky than an implied from one source. As another example, a first-generation implied may be more reliable/less risky than a second-generation implied. But beyond the simple filtering of current systems, no additional information about the quality of the implied order is determined or provided. As a result, current systems may expose a trader to unexpected risk. If a trader has a better understanding of the quality of an implied order, the trader is better able to gain benefits from utilizing implieds while reducing risk to a level they want.

III. Determining a Quality for an Implied Order

Implied orders may have varying degrees of quality depending on several factors.

Certain embodiments of the present inventions utilize various techniques for determining a quality for an implied order. The quality may be determined based on the generation of the implied order, the origin of the implied order, the number and/or quantity of the orders the implied order is derived from, the price level of the implied order, and/or the combination of one or more techniques, for example.

The quality for an implied order may be represented in a variety of ways. For example, the quality may be represented as a binary value: does the implied order have quality, "yes" or "no." As another example, the quality may be represented on a scale from 0.0 to 1.0 or from zero to five stars. As another example, the quality may be represented as an absolute number. As another example, quality may be represented by relative terms such as "low," "medium," and "high" or "+" and "−". Such relative terms (and their meaning/definition) may be predefined and/or specified by a user, for example.

The quality for an implied order may be determined using various techniques, as discussed below. It should be understood that a value representing the quality of an implied order may be determined using these techniques. For example, determined values may be compared to a threshold for a binary representation of quality or normalized to fit a scale from 0.0 to 1.0. As another example, if multiple techniques are used, a quality value may be determined by using, for example, the highest, lowest, sum, average, product, or a weighted average of the individual values determined with each technique. As another example, if multiple techniques are used, a quality value may be determined using a user-specified formula.

It should also be understood that the following techniques may be described in terms of determining whether a particular set of factors results in "better" or "higher" versus "worse" or "lower" quality. The particular configuration parameters for such techniques may be predetermined or configured by a user and may be particular to a tradable object, trading strategy, and/or trader preference, for example. For example, one user might specify that each additional source is given the same weight while another user might want to use "diminishing return" (second source=1, third source=0.5, fourth source=0.25, etc.) because the user may believe that once there is a second source he is "safe." Further, another user might want to use an "increasing return" (second source=1, third source=2, fourth source=3, etc.) because the user may believe that the more sources, the higher the likelihood that all of them will stay because the price is legitimate and not an arbitrage opportunity. Additionally, the parameters may also be configured based on other factors such as historical data and time of day and may change dynamically over time, for example. The techniques utilized, and their corresponding configuration parameters, may be specified per tradable object, per trader, per group, and/or per firm, for example.

One technique for determining a quality for an implied order is based on the generation of the implied order. An implied order based on direct orders may have a higher quality than an implied order which is based on an implied order, for example. A third-generation implied order may be of even lower quality, for example. For example, an implied order for tradable object "A" which is implied from direct orders for tradable objects "B" and "AB" may be determined to have a high quality represented by a quality value of 1.0. An implied order for tradable object "A" which is implied from a direct order for tradable object "B" and an implied order for tradable object "AB" maybe determined to have a lower quality represented by a quality value of 0.75. An implied order for tradable object "A" which is implied from second-generation implied orders for tradable objects "B" and "AB" may be determined to have an even lower quality represented by a quality value of 0.1.

One technique for determining a quality for an implied order is based on the origin of the implied order. An implied order determined by an exchange may have a higher quality than an implied order which has been determined based on a local calculation, for example. This may be because, for the particular exchange, if an implied order is provided by the exchange it is available to match against whereas one determined by a local calculation may not necessarily be recognized by the exchange for matching against (that is, quality may be based on origin availability). Also, an implied provided by an exchange may be preferable to an implied calculated locally based on tradable objects that are at different exchanges because the latter cannot be matched against directly. Further, a locally calculated implied based on tradable objects at the same exchange may have a higher quality than a locally calculated implied based on a tradable objects at different exchanges because, even though neither may be matched against directly, the latter may involve more fees, more latency, and/or more uncertainty to achieve the desired trade.

Another reason that an implied order determined by an exchange may have higher quality may be that a locally calculated implied order is based on older (and potentially out of date) market data which, combined with the time to calculate the implied order, may no longer reflect the current market (that is, quality may be based on temporal origin). In this case, the market provided implied order may be more current and thus higher quality. However, if an exchange provides only an implied quantity at an implied price that is treated as a single implied order, the quality may be determined to be lower because the details of what makes up the implied quantity may be unknown and therefore riskier.

Another reason that the quality for an implied order may be higher is if the origin of the implied order is closer or from a preferred exchange (that is, quality may be based on origin locality). For example, if a trader is in Chicago, an implied order available at an exchange in Chicago may be viewed as being higher quality than a comparable implied order at an exchange in Japan because the trader may be able to match against the implied order in Chicago more quickly due to lower latency. As another example, a trader may have lower fees to trade at one exchange as compared to another exchange.

One technique for determining a quality for an implied order is based on the number of orders making up the quantity the implied order is derived from. The number of orders making up the quantity at a price level may be known or estimated, for example. For example, an electronic exchange may provide information about the number of orders at a particular price level. As another example, the number of orders at a particular price level may be estimated by a trading system such as an automated trading tool. An implied order is typically derived based on the total quantity available at the price level, but if more detailed information about the number of orders making up the quantity is provided, then a quality for the implied order may be determined based on this information. In general, an implied order derived from quantity available at a price level made up of more orders is of higher quality than quantity made up of fewer orders. For example, consider a case where the quantity available at a price level for a tradable object from which an implied order is being derived is 10. The quality of the implied order is lower if the quantity of 10 is from a single order of size 10 than if it quantity is from 10 orders of size 1. This is because, in the former case, the entire quantity of 10 would become unavailable (and thus the implied order would no longer be available) if a single trader cancelled their order, for example. In the latter case, even if 5 of the traders that placed orders of size 1 decided to cancel their orders, there would still be a quantity of 5 available (and thus the implied order would still be available, albeit potentially at a reduced quantity). Therefore, the implied order is less likely to go away (and is therefore less risky) when it is derived from quantity made up of more orders (and may thus be viewed as having higher quality).

One technique for determining a quality for an implied order is based on the quantity distribution of the orders making up the quantity the implied order is derived from. As mentioned above, the number of orders making up the quantity at a price level may be known or estimated, for example. In certain systems, the individual quantity of the orders may also be known or estimated, for example. For example, an electronic exchange may provide information about the individual quantities of the orders at a particular price level. As another example, the individual quantities of the orders at a particular price level may be estimated by a trading system such as an automated trading tool. As noted above, an implied order is typically derived based on the total quantity available at the price level, but if more detailed information about the number of orders making up the quantity is provided, then a quality for the implied order may be determined based on this information. In general, an implied order derived from quantity available at a price level made up of orders with a more even quantity distribution is of higher quality than quantity with less even quantity distribution. For example, consider a case where the quantity available at a price level for a tradable object from which an implied order is being derived is 10 and this quantity comes from five orders. The quality of the implied order is lower if the quantity of one order is 6 and the other four orders each have a quantity of 1. In contrast, the quality of the implied order is higher if the quantity of each of the five orders is 2. This is because, in the former case, most of the quantity of 10 would become unavailable if the trader for the order of quantity 6 cancelled that order, as only a quantity 4 would remain (and thus the implied quantity of the implied order may be significantly reduced). In the latter case, even if 2 of the traders that placed orders of size 2 decided to cancel their orders, there would still be a quantity of 6 available (and thus the implied quantity of the implied order would not be as significantly reduced even though twice as many traders cancelled their orders). Therefore, the implied quantity of the implied order is less likely to go away as significantly (and is therefore less risky) when it is derived from a quantity made up of orders with more even quantity distribution (and may thus be viewed as having higher quality).

One technique for determining a quality for an implied order is based on the relationship of the implied price for the implied order to the quantity available at other price levels. An implied order at one price level may have higher quality when there are other orders (direct and/or implied) at or near that price level because it may indicate that the implied order's price level is legitimate, reasonable, reflective of the market, and/or more likely to remain in the market. In contrast, an implied order at a price level may have lower quality when that price level is distanced from price levels with other orders (implied or direct) because it may indicate that the implied order's price level is not reasonable or reflective of the market. For example, in a sparse market, an implied order at a price level between two price levels which have direct orders may be of higher quality than an implied order at a price level 10 ticks above the next closest price level with any implied or direct quantity.

IV. Determining an Aggregate Quality for Implied Orders

In addition to determining a quality for a particular implied order, certain embodiments of the present inventions utilize various techniques for determining an aggregate quality for implied orders at a particular price level. It should be understood that the aggregate quality may be determined for implied orders at a group of price levels using similar techniques as well. This may happen when, for example, price level consolidation is utilized. However, for clarity, the following discussion, unless otherwise indicated, discusses the determination of an aggregate quality for implied orders at the same price level. The aggregate quality may be determined based on the number and/or quantity of the implied orders, the price level of the implied orders, and/or the combination of one or more techniques, for example.

The aggregate quality for implied orders may be represented in a variety of ways, similar to the quality for implied orders discussed above.

The aggregate quality for implied orders may be determined using various techniques, as discussed below. It should be understood that a value representing the aggregate quality may be determined using these techniques. For example, determined values may be compared to a threshold for a binary representation of aggregate quality or normalized to fit a scale from 0.0 to 1.0. As another example, if multiple techniques are used, an aggregate quality value may be determined by using, for example, the highest, lowest, sum, average, product, or a weighted average of the individual values determined with each technique. As another example, if multiple techniques are used, an aggregate quality value may be determined using a user-specified formula.

Similar to the quality for implied order discussed above, it should also be understood that the following techniques may be described in terms of determining whether a particular set of factors results in "better" or "higher" versus "worse" or "lower" aggregate quality. The particular configuration parameters for such techniques may be predetermined or configured by a user and may be particular to a tradable object, trading strategy, and/or trader preference, for example. Additionally, the parameters may also be configured based on other factors such as historical data and time of day and may change dynamically over time, for example. The techniques utilized and their corresponding configuration parameters may be specified per tradable object, per trader, per group, and/or per firm, for example.

One technique for determining an aggregate quality for implied orders is based on the number of implied orders at a particular price level. This may also be referred to as the number of sources for the implied quantity at a particular price level. For reasons similar to those discussed above with respect to determining a quality for an implied order based on the number of orders making up the quantity the implied order is derived from, a price level with more implied orders may have a higher aggregate quality than a price level with fewer implied orders. For example, a price level with a single implied order (from, for example, Leg A and Leg B) may be of lower aggregate quality than a price level with multiple implied orders (from, for example, A-B and spreads AC-CB and AD-DB).

One technique for determining an aggregate quality for implied orders is based on the quantity distribution of the implied orders at a particular price level. Similar to the technique discussed above for determining a quality for an implied order based on the quantity distribution of the orders from which the implied order is derived, this technique makes use of known implied quantity for implied orders at the particular price level. In general, implied orders at a particular price level with a more even implied quantity distribution is of higher quality than implied orders with less even quantity distribution. For example, consider a case where the total implied quantity at a particular price level for a tradable object is 99 and this quantity comes from 3 implied orders. The aggregate quality for the implied orders is lower if one implied order has an implied quantity of 97 and the other two implied orders each have an implied quantity of 1. In contrast, the aggregate quality for the implied orders is higher if each of the implied orders has an implied quantity of 33. In certain embodiments, the aggregate quality may be determined based on the quantity of direct order(s) at the particular price level. In this situation, the quantity for the direct orders may be known or estimated, for example.

One technique for determining an aggregate quality for implied orders is based on the relationship of the implied price for the implied orders to the quantity available at other price levels. Similar to the technique discussed above for determining a quality for an implied order based on the relationship of the implied price for the implied order to the quantity available at other price levels, this technique is based on the idea that implied orders at a particular price level may have higher quality when there are other orders (direct and/or implied) at or near that price level because it may indicate that the implied orders' price level is legitimate, reasonable, reflective of the market, and/or more likely to remain in the market.

The aggregate quality for implied orders may be determined using more than one of the techniques discussed above in combination. For example, the determined aggregate qualities using one or more techniques individually may be averaged, summed, multiplied, and/or combined using a formula such as a weighted average or a user-specified formula. The techniques utilized and their corresponding configuration parameters, may be specified per tradable object, per trader, per group, and/or per firm, for example.

V. Quality Indicators

In certain embodiments, an indicator of the quality for an implied order and/or of the aggregate quality for implied orders is provided. That is, the quality indicator represents a quality value and/or or an aggregate quality value. For example, an indicator may be provided in a user interface for an automated trading tool.

The quality indicator may include an icon, a color, a number, text, and/or a graph, for example. For example, a quality indicator may be one or more icons of stars corresponding to the quality of an implied order and/or an aggregate quality of the implied orders at a price level. As another example, each implied order displayed by an automated trading tool may have a color coding and/or number that indicates the quality of that implied order. As another example, each price level containing one or more implied orders may have a color coding and/or number that indicates the aggregate quality of the implied orders at that price level. As another example, the quality indicator may be a background color (or color gradient or brightness) of the indicator for the implied order. Darker backgrounds may be lower quality and lighter backgrounds may be higher quality, for example. As another example, text may be used for the quality indicator, such as letters (for example, grades "A"-"F" or words "low" to "high"). As another example, the font type (for example, Times or Courier), size (for example, 8 point or 14 point), and/or style (for example, bold or underlined) may be utilized in a quality indicator. As another example, the quality indicator may be a bar graph or pie graph representing a quality value relative to a maximum quality value (for example, as a percentage from 0-100% or in a range from 0.0 to 1.0).

In certain embodiments, a quality indicator may not be provided. For example, if the quality for an implied order (or the aggregate quality for implied orders) conforms to a threshold (such as the quality being above or below a threshold value), no quality indicator may be given. This may be used to indicate to a user that the quality is either sufficient or insufficient for the user's risk tolerance, for example. As another example, a quality indicator may not be provided because it is being utilized by an automated trading system that does not display the quality indicator to a user. For example, an algorithmic trading system or "black box" trading system may utilize the quality indicator in making trading decisions, but may not display it. Alternatively, such a system may utilize the quality value directly rather than a generate quality indicator.

In certain embodiments, an implied order with a determined quality value (or implied orders with a determined aggregate quality value) may be filtered based on the determined quality value and not provided at all. For example, if the quality value for an implied order conforms to a threshold (such as the quality value is below a threshold value) then the implied order may not be displayed. This may be used to filter out the display of implied quantity that a user has identified as being of too low of quality to consider at all. Similarly, a threshold value may be applied to an aggregate quality value as well. In this case, all of the implied orders may not be provided if they are not of sufficient aggregate quality, for example.

In certain embodiments, the quality indicator may include multiple features. For example, a quality indicator may include a numeric representation of a quality value along with a background color coding representing the quality value.

VI. Example Trading Interfaces

Quality and/or aggregate quality indicators may be employed in an interface of a trading application. In certain embodiments, the trading application allows a trader or automated trading component to make trading decisions based on the quality indicators. For example, a trader may place an order at a particular price based on a quality indicator. As another example, an automated trading component may lean on a particular price level based on an aggregate quality indicator.

FIG. 3A illustrates a trading interface 310 in which certain embodiments of the present inventions may be employed. The trading interface 310 includes a price column 311, a bid quantity column 312, and an ask quantity column 313.

The quantity available to buy or sell at each price level along the price column 311 is illustrated as a queue of the orders at that price level. For example, at the price level 99700, there are two orders, each of size 1, to buy the tradable object pending in the order queue.

Implied orders in the trading interface 310 as displayed with a quality indicator. As illustrated in FIG. 3A, the quality indicator is a numeric representation of the quality for the implied order shown in parentheses next to the quantity for the implied order. For example, price level 99750 includes an implied order to sell the tradable object with a size of 2 and a determined quality value of 0.25.

FIG. 3B illustrates a trading interface 320 in which certain embodiments of the present inventions may be employed. The trading interface 320 includes a price column 321, a bid quantity column 322, and an ask quantity column 323.

The total quantity available to buy or sell at each price level along the price column 321 is shown in the respective bid column 322 and ask column 323.

In the bid column 322, for price levels which include implied quantity 324 in the total quantity available, the total implied quantity (which may be from one or more implied orders) is shown after a "/" and the aggregate quality for the implied orders at that price level is shown in parentheses.

In the ask column 323, for price levels which include implied quantity 325 in the total quantity available, the aggregate quality for the implied orders at that price level is shown in parentheses. In addition, a different background color is used to indicate the presence of the implied orders at the price levels.

In certain embodiments, the total implied quantity is shown in a separate column. In certain embodiments, the aggregate quality is shown in a separate column.

FIG. 3C illustrates a trading interface 330 in which certain embodiments of the present inventions may be employed. The trading interface 330 includes a market grid with a bid quality column 332 and an ask quality column 333.

In the bid quality column 332, the aggregate quality for the implied orders at each price level is represented using text and various styles to indicate the quality. For example, the text "AVG" in a sans serif font and medium font size is used at the 99725 price level corresponding to an aggregate quality of "0.6". The text "HIGH" in a serif font, larger font size, and bold face and underlining is used at the 99650 price level corresponding to an aggregate quality of "0.8."

In the ask quality column 333, the aggregate quality for the implied orders at each price level is represented using bar graphs. For example, the bar graph at the 99760 price level corresponds to an aggregate quality of "0.25" and the bar graph at the 99825 price level corresponds to an aggregate quality of "0.75."

It should be understood that the trading interfaces discussed above are only examples of trading interfaces in which certain embodiments may be employed. Quality indicators and aggregate quality indicators may be incorporated into other trading interfaces as well, for example. For example, quality and/or aggregate quality indicators may be utilized in a trading interface with a static or dynamic price axis or field of prices. As another example, the prices may not necessarily be sequential. As another example, the prices may not be in a linear column, but instead in a row, or along a curve, or other known configuration. As another example, trading interface may include a market grid, which may show just the inside market prices or may include price levels away from the inside market.

Additional Example Embodiments

Figure 4:
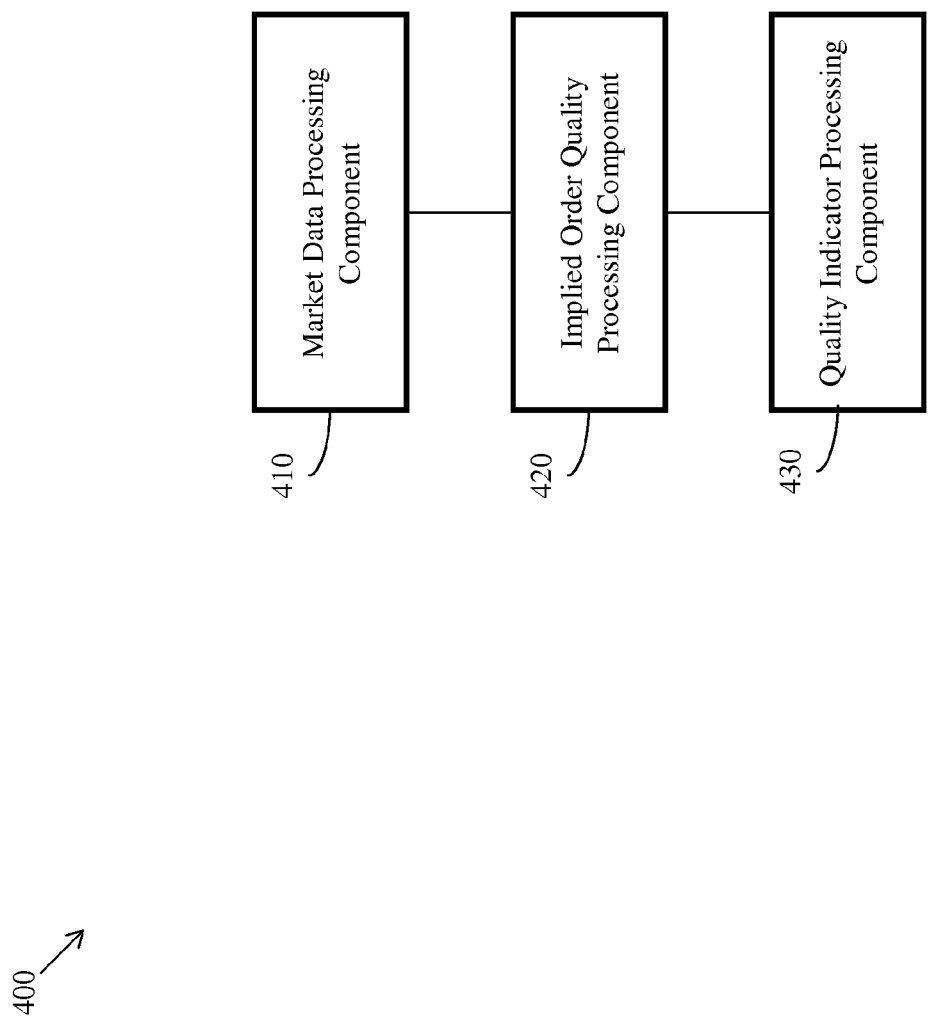
FIG. 4 illustrates a block diagram of a system according to an embodiment of the present inventions.

FIG. 4 illustrates a block diagram of a system 400 according to an embodiment of the present inventions. The system 400 includes a market data processing component 410, an implied order quality processing component 420, and a quality indicator processing component 430.

The implied order quality processing component 420 is in communication with the market data processing component 410 and the quality indicator processing component 430.

In operation, the market data processing component 410 is adapted to receive market data relating to one or more tradable objects. The market data may be received from an exchange similar to the exchange 130 and/or the exchange 230 discussed above, for example.

In certain embodiments, the market data includes implied order data. For example, the market data may include implieds provided by an exchange. As another example, the market data may include implieds calculated by a gateway or implied engine based on data provided by an exchange. In certain embodiments, the market data processing component 410 is adapted to calculate implied orders based on the received market data. For example, the market data processing component 410 may include an application which calculates implieds based on the market data.

The market data processing component 410 is adapted to communicate the implied orders to the implied order quality processing component 420.

The implied order quality processing component 420 is adapted to receive an implied order. The implied order may be received from the market data processing component 410, for example.

In certain embodiments, the implied order quality processing component 420 is adapted to determine a quality value for the implied order. The implied order quality processing component 420 may utilize one or more of the various techniques (including combinations of those techniques) discussed above for determining the quality value for the implied order.

In certain embodiments, the implied order quality processing component 420 is adapted to determine an aggregate quality value for a plurality of implied orders. The implied order quality processing component 420 may utilize one or more of the various techniques (including combinations of those techniques) discussed above for determining the aggregate quality value for the implied orders.

The implied order quality processing component 420 is adapted to communicate the determined quality value and/or aggregate quality value to the quality indicator processing component 430.

The quality indicator processing component 430 is adapted to receive a quality value and/or an aggregate quality value for one or more implied orders. The quality value and/or the aggregate quality value may be received from the implied order quality processing component 420, for example.

The quality indicator processing component 430 is adapted to generate a quality indicator representing the quality value for an implied order and/or an aggregate quality indicator representing the aggregate quality value for the implied orders. The quality indicator may be similar to the quality indicators discussed above, for example.

In certain embodiments, the quality indicator processing component 430 provides the generated quality indicator/aggregate quality indicator to a trading interface. The trading interface may be part of a trading application and the quality indicator may be used by a trader or automated trading component to make trading decisions. In certain embodiments, the trading interface displays the generated quality indicator/aggregate quality indicator.

In certain embodiments, the market data processing component 410 is part of a gateway similar to the gateway 120 and/or the gateway 220 discussed above, for example. In certain embodiments, the market data processing component 410 is part of a client device similar to the client device 110 and/or the client device 210 discussed above, for example. In certain embodiments, the market data processing component 410 is part of a server device shared by multiple client devices. In certain embodiments, the market data processing component 410 is part of a trading application. In certain embodiments, the market data processing component 410 is part of an implied engine.

In certain embodiments, the implied order quality processing component 420 is part of a gateway similar to the gateway 120 and/or the gateway 220 discussed above, for example. In certain embodiments, the implied order quality processing component 420 is part of a client device similar to the client device 110 and/or the client device 210 discussed above, for example. In certain embodiments, the implied order quality processing component 420 is part of a server device shared by multiple client devices. In certain embodiments, the implied order quality processing component 420 is part of a trading application. In certain embodiments, the implied order quality processing component 420 is part of an implied engine.

In certain embodiments, the quality indicator processing component 430 is part of a gateway similar to the gateway 120 and/or the gateway 220 discussed above, for example. In certain embodiments, the quality indicator processing component 430 is part of a client device similar to the client device 110 and/or the client device 210 discussed above, for example. In certain embodiments, the quality indicator processing component 430 is part of a server device shared by multiple client devices. In certain embodiments, the quality indicator processing component 430 is part of a trading application. In certain embodiments, the quality indicator processing component 430 is part of an implied engine.

The components, elements, and/or functionality of the system 400 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a processor of a general purpose computer or other processing device.

FIG. 5 illustrates a flowchart 500 of a method according to an embodiment of the present inventions. The method includes the following steps which will be described below in more detail. At step 510, an implied order is received. At step 520, a quality value is determined. At step 530, a quality indicator is generated. The method is described with reference to elements of systems discussed above, but it should be understood that other implementations are possible.

At step 510, an implied order is received. The implied order may be received from a market data processing component similar to the market data processing component 410 discussed above, for example.

The implied order may be provided by an exchange and/or may be calculated based on the market data received from an exchange. The implied order may be one of a plurality of received implied orders.

At step 520, a quality value is determined. The quality value may be a quality value for an implied order or an aggregate quality value for a plurality of implied orders. The quality value may be determined by an implied order quality processing component similar to the implied order processing component 420 discussed above, for example. The implied order(s) may be the implied order(s) received at step 510 discussed above, for example.

The quality value may be determined utilizing one or more of the various techniques (including combinations of those techniques) discussed above for determining the quality value for the implied order. The aggregate quality value may be determined utilizing one or more of the various techniques (including combinations of those techniques) discussed above for determining the aggregate quality value for the implied orders.

At step 530, a quality indicator is generated. The quality indicator may be generated by a quality indicator processing component similar to the quality order processing component 430 discussed above, for example. The quality indicator may be generated based on the quality value determined at step 520 discussed above, for example. The quality indicator may be similar to the quality indicators discussed above, for example.

In certain embodiments, the quality indicator is displayed. The quality indicator may be displayed by a trading interface, for example. The trading interface may be part of a trading application and the quality indicator may be used by a trader or automated trading component to make trading decisions.

One or more of the steps of the method 500 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a processor of a general purpose computer or other processing device.

Certain embodiments of the present inventions may omit one or more of these steps and/or perform the steps in a different order than the order listed. For example, some steps may not be performed in certain embodiments of the present inventions. As a further example, certain steps may be performed in a different temporal order, including simultaneously, than listed above.

While the present inventions have been described with reference to certain embodiments, it will be understood by those skilled in the art that various changes may be made and equivalents may be substituted without departing from the scope of the inventions. In addition, many modifications may be made to adapt a particular situation or material to the teachings of the inventions without departing from their scope. Therefore, it is intended that the inventions not be limited to the particular embodiments disclosed, but that the inventions will include all embodiments falling within the scope of the claims.

The invention claimed is:

1. A method including:
   receiving by a computing device an implied order for a tradable object, wherein the implied order is derived from a plurality of orders;
   determining by the computing device a quality value for the implied order for the tradable object, wherein the quality value is determined based on the quantity of the orders the implied order is derived from; and
   generating by the computing device a quality indicator representing the quality value for the implied order.

2. The method of claim 1, wherein the implied order is provided by an exchange.

3. The method of claim 1, wherein the implied order is determined by the computing device.

4. The method of claim 1, wherein the quality value is determined based on a generation of the implied order.

5. The method of claim 1, wherein the quality value is determined based on an origin of the implied order.

6. The method of claim 1, wherein the quality value is determined based on the number of orders the implied order is derived from.

7. The method of claim 1, wherein the quality value is determined based on a price level of the implied order.

8. The method of claim 1, further including filtering by the computing device the implied order based on the determined quality value.

9. The method of claim 1, further including displaying by the computing device the generated quality indicator.

10. The method of claim 1, wherein the quality indicator includes a number.

11. The method of claim 1, wherein the quality indicator includes a color.

12. The method of claim 1, wherein the quality indicator includes a graph.

* * * * *